Patented Aug. 10, 1926.

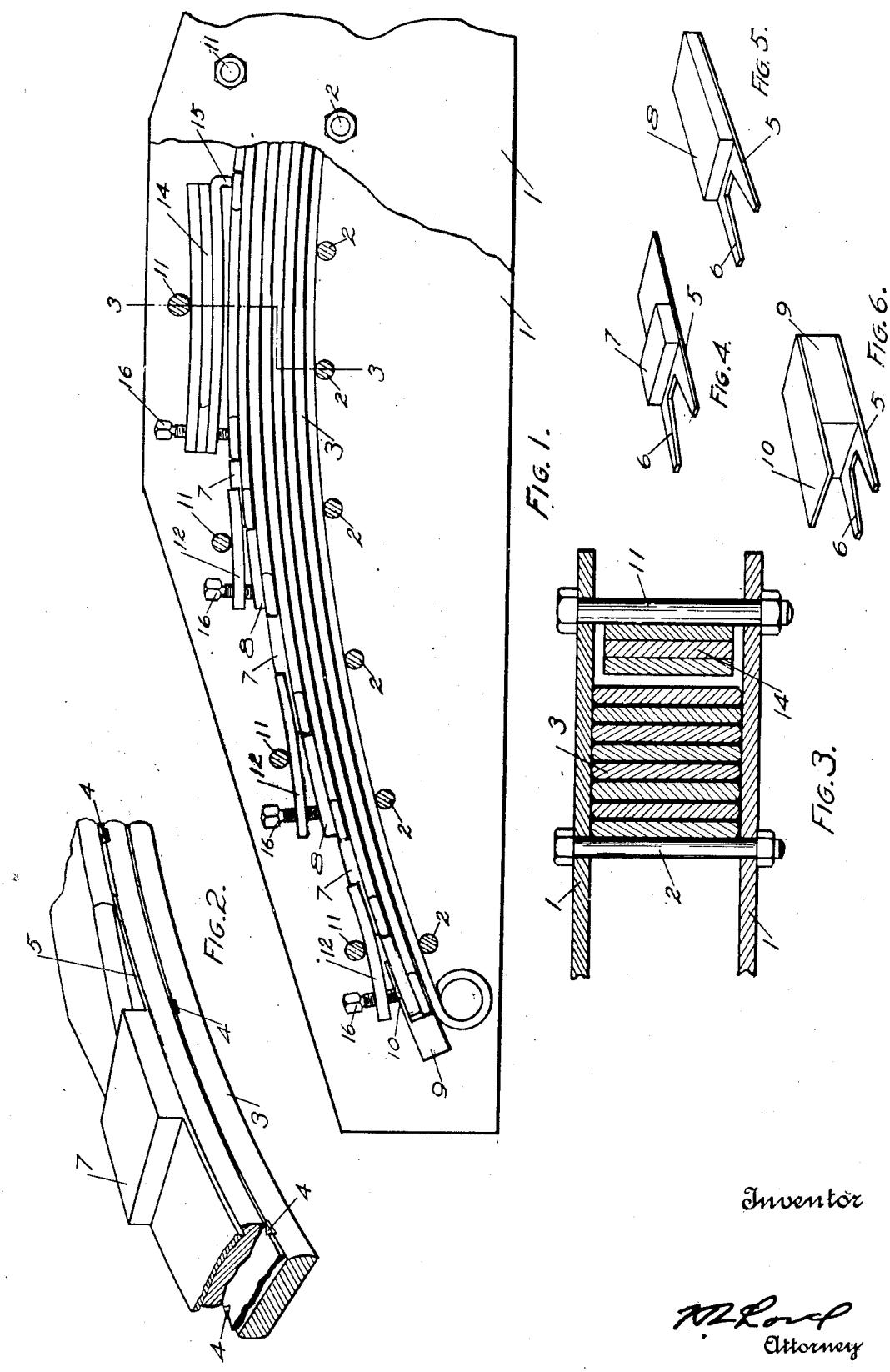

1,595,411

UNITED STATES PATENT OFFICE.

HUGH C. LORD, OF ERIE, PENNSYLVANIA.

METHOD OF AND APPARATUS FOR MOLDING RUBBER INSERTS BETWEEN THE LEAVES OF SPRINGS.

Application filed August 17, 1925. Serial No. 50,624.

Springs have been designed as indicated in my Patent #1,443,545, granted Jan. 30, 1923, in which rubber is inserted between the leaves of a spring leaf, the opposing faces of the rubber being secured to the opposing faces of the leaves. The present invention is directed to an improved method and mold for forming the rubber in the spring. Features and details of the invention will appear from the specification and claims.

The apparatus forming the subject matter of the invention and with which the method may be practiced is illustrated as follows:—

Fig. 1 shows a side elevation of the mold, a part being removed to better show construction.

Fig. 2 an enlarged view of a section of the spring as it is arranged in the mold.

Fig. 3 a section on the line 3—3 in Fig. 1.

Fig. 4 a perspective view of one of the dams for the end spaces between the leaves.

Fig. 5 a similar view of a slightly different form of dam.

Fig. 6 also a similar view of a slightly different form of dam.

The mold is formed with the side plates 1—1. These are connected by a series of bolts 2 which are arranged in a curve, or shape, at which it is desired to force the spring as the rubber is vulcanized between the leaves. Ordinarily these are shaped to flex the spring to the position that it assumes under the static load for which it is designed. The spring is made up of the leaves 3, the main leaf resting on the bolts 2.

The springs are spaced apart by metal spacers 4. These are preferably small triangular pieces of metal which are placed in the space between the leaves at each edge of the spring and are of the thickness that it is desired to give the rubber between the leaves. Preferably they are thicker at the outer ends of the leaves than at the center, in fact, only a skin of rubber is ordinarily desirable at the center. Inasmuch as the springs are put under very heavy compression during vulcanizing which brings the leaves into clamping engagement on the spacing parts. The triangular shape of these spacers is very advantageous in that they can be quite readily removed after the spring is formed, in fact, they will work themselves out through the action of the spring if not removed prior to the use of the spring.

It is desirable to entirely enclose the rubber during vulcanizing and to subject it in the vulcanizing process to considerable pressure. This is desirable for several reasons. It is desirable in so far as it improves the quality of the rubber. It is also desirable in that a bond with the metal may be made more certain and it also assures the filling of the rubber in the entire space between the leaves. To accomplish this it is necessary to place between the leaves a slightly greater amount of rubber than the finished thickness of rubber and then subject this to pressure so that as the rubber softens it will be forced to the final shape controlled by the spacers 4. The side plates 1 engaging the edges of the leaves close the spaces at the sides of the leaves. It is necessary to dam the spaces at the ends of the leaves. Ordinarily the leaves are stepped up as to length and I provide a dam plate 5 with an end 6 conforming to the usual shape of the end of the leaf which is inserted between the end of the leaf and the adjacent face of the leaf. Some of the dams are provided with a block 7, others with an elongated block 8, and the end ones with the blocks 9 and projecting plate 10. The dam with the block 7 is placed under the shortest spring, the block 7 forming a stop at the end of the spring positioning the end 6 to slightly underlap the edge of the short leaf. The next adjacent end leaf, is provided with a dam having an elongated plate 8. Bolts 11 extend through the plates 1—1 in position to engage a spring plate 12 about midway of the length of the spring plate 12. One end of the spring plate is arranged against the block 7 and on the rear of the plate 5. The opposite end of the spring has a set screw 13 and engages the block 8. As pressure is put on the set screw the spring plate 12 is flexed exerting pressure at one end on the dam plate having the block 7 holding it in place and at the same time exerting a spring pressure on the end of the spring leaf directly beneath it. The same thing is accomplished with relation to the set screw at the opposite end of the plate 12 operating on the block 8. It not only holds the plate 5 in place under the spring end but presses down the spring leaf immediately under the block 8. These pairs of dams with their spring plates 12 are carried along the spring so as to hold the dams in place and exert a follow-up or spring pressure on the ends of the leaves and this follow-up or spring pressure is not only exerted on the ends of the spring immediately under the plates but these through the spacers 4 immediately at the places engaged communicate this pressure through the remaining leaves of the spring so that the leaves are subjected to heavy spring pressure which follows up the yielding of the rubber as it softens. The end dam having the block 9 and plate 10 is formed as it is because it is not necessary to carry the pressure to a succeeding leaf and the return plate 10 over the top of the second leaf directly receives the set screw of the last spring plate 12.

At the center plates 14 are arranged under the bolt 11, the bottom plate having the inturned end 15 and a set screw, a set screw 16 being arranged at the opposite end, three leaves being provided at this point to exert added pressure necessary for the center.

In setting up the mold the spring is brought down to the position against the bolts 2 and ordinarily held in this position by an outside means between the eyes of the spring. The side plates 1 are brought up into engagement with the leaves but not finally clamped and the spring pressure is placed on the leaves through the action of the set screws 16. As the screws are set up, one after the other, the rubber yields even in the cold state to some extent and finally the side plates are brought up into quite close contact with the edges of the spring but not sufficiently clamped to prevent a yielding or sliding movement of the blades to position as the rubber becomes more fully softened. The spring is then vulcanized, ordinarily in an open heat, the leaves being processed by any desirable means and the rubber being compounded to affect a union between the rubber and the faces of the spring leaves.

This method of molding each leaf with its separate layer of rubber in this manner has many advantages, one of which is the ease with which the finished article may be inspected. After the vulcanization the rubber flowing into the slight spaces formed at the edges of the leaves indicates clearly whether the spaces are entirely filled and whether the rubber during the vulcanization in these spaces was under pressure. The method also can be practiced with a comparatively cheap mold, which mold may be quite rapidly assembled and set up for use.

What I claim as new is:—

1. The method of vulcanizing rubber inserts between spring leaves which consists in spacing the leaves with spacers, holding the leaves in engagement with the spacers and encasing the rubber during vulcanization.

2. The method of vulcanizing rubber inserts between spring leaves which consists in spacing the leaves with removable spacers, holding the leaves in engagement with the spacers, and encasing the rubber during vulcanization.

3. The method of vulcanizing rubber inserts between spring leaves which consists in spacing the leaves with spacers, holding the leaves in engagement with the spacers, and encasing the rubber separately in each space between the leaves during vulcanization.

4. The method of vulcanizing rubber inserts between spring leaves which consists in spacing the leaves with spacers, holding the leaves in engagement with the spacers, and encasing the rubber during vulcanization, the spacers varying in thickness to vary the thickness of the insert.

5. The method of vulcanizing rubber inserts between spring leaves which consists in damming the space between each pair of leaves at the ends of the leaves and closing the sides of the spaces by a closure means engaging the edges of the leaves.

6. The method of vulcanizing rubber inserts between spring leaves which consists in damming the space between each pair of leaves at the ends of the leaves and closing the sides of the spaces by a closure means engaging the edges of the leaves and exerting pressure on the leaves.

7. The method of vulcanizing rubber inserts between spring leaves which consists in damming the space between each pair of leaves at the ends of the leaves and closing the sides of the leaves and exerting pressure on the leaves while maintaining the space between the leaves by spacers.

8. The method of vulcanizing rubber inserts between spring leaves which consists in damming the space between each pair of leaves at the ends of the leaves and closing the sides of the spaces by a closure means engaging the edges of the leaves and exerting follow-up pressure on the leaves.

9. In a rubber mold for vulcanizing rubber inserts between the leaves of springs, the combination of means for holding rubber under pressure in the spaces between the leaves; and spacers between the leaves controlling the thickness of the spaces.

10. In a rubber mold for vulcanizing rubber inserts between the leaves of springs, the combination of means for holding rubber under pressure in the spaces between the leaves; and spacers inserted along the edges of the leaves for maintaining the spaces between the leaves.

11. In a rubber mold for vulcanizing rubber inserts between the leaves of springs, the combination of means for holding rubber under pressure in the spaces between the leaves; and bevelled spacers inserted along the edges of the leaves for maintaining the spaces between the leaves.

12. In a spring mold, the combination of side plates; means for drawing said plates together against the edges of the spring leaves; means between the leaves forming a base for one side of the spring; and means for exerting pressure on the spring leaves at the opposite side of the spring.

13. In a spring mold, the combination of side plates; means for drawing said plates together against the edges of the spring leaves; means between the leaves forming a base for one side of the spring; and means for exerting follow-up pressure at the opposite side of the spring.

14. In a spring mold, the combination of side plates; means for drawing said plates together against the edges of the spring leaves; means between the leaves forming a base for one side of the spring; and means for exerting follow-up pressure at the opposite side of the spring comprising a series of springs.

15. In a spring mold, the combination of side plates; means for drawing said plates together against the edges of the spring leaves; means between the leaves forming a base for one side of the spring; and means for exerting follow-up pressure at the opposite side of the spring comprising pins between the side plates, and spring blades under the pins and engaging the spring leaves.

16. In a spring mold, the combination of side plates; means for drawing said plates together against the edges of the spring leaves; means between the leaves forming a base for one side of the spring; and means for exerting follow-up pressure at the opposite side of the spring comprising pins between the side plates, spring blades under the pins and engaging the spring leaves, and screws on the spring blades for placing them under tension.

17. In a spring mold, the combination of side plates; means between the plates forming a base for the spring; means for holding the plates together; and a series of dams arranged under the ends of the leaves.

18. In a spring mold, the combination of side plates; means between the plates forming a base for the spring; means for holding the plates together; a series of dams arranged under the ends of the leaves; and means operating on the dams for exerting pressure on the spring leaves.

19. In a spring mold, the combination of side plates; means between the plates forming a base for the spring; means for holding the plates together; a series of dams arranged under the ends of the leaves; and means operating on the dams for exerting pressure on the spring leaves, said means locking the dams in place.

20. In a mold, the combination of side plates; bolts connecting said side plates and forming a base for the spring; a series of pins between the side plates at the opposite side of the spring; dams under the ends of the leaves; and spring blades under the pins and resting on the dams exerting yielding pressure on the spring.

21. In a mold, the combination of side plates; bolts connecting said side plates and forming a base for the spring; a series of pins between the side plates at the opposite side of the spring; dams under the ends of the leaves; spring blades under the pins and resting on the dams exerting yielding pressure on the spring; and spacers between the spring leaves.

In testimony whereof I have hereunto set my hand.

HUGH C. LORD.